United States Patent
Xiao et al.

(10) Patent No.: US 8,605,673 B2
(45) Date of Patent: Dec. 10, 2013

(54) METHOD, APPARATUS AND SYSTEM FOR ALLOCATING DOWNLINK POWER

(75) Inventors: Dengkun Xiao, Beijing (CN); Qiang Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 175 days.

(21) Appl. No.: 13/257,259

(22) PCT Filed: Mar. 17, 2009

(86) PCT No.: PCT/CN2009/070827
§ 371 (c)(1),
(2), (4) Date: Sep. 16, 2011

(87) PCT Pub. No.: WO2010/105405
PCT Pub. Date: Sep. 23, 2010

(65) Prior Publication Data
US 2012/0002636 A1    Jan. 5, 2012

(51) Int. Cl.
*H04W 4/00* (2009.01)
(52) U.S. Cl.
USPC .......................................................... 370/329
(58) Field of Classification Search
USPC ................ 370/310, 328–330, 343–344
See application file for complete search history.

(56) References Cited

U.S. PATENT DOCUMENTS

| | | | |
|---|---|---|---|
| 5,579,373 A | 11/1996 | Jang | |
| 2005/0136961 A1 | 6/2005 | Simonsson et al. | |
| 2008/0076438 A1 | 3/2008 | Chang et al. | |
| 2008/0298486 A1 | 12/2008 | Venturino et al. | |
| 2009/0042593 A1* | 2/2009 | Yavuz et al. | 455/522 |
| 2009/0069023 A1* | 3/2009 | Ahn et al. | 455/450 |

(Continued)

FOREIGN PATENT DOCUMENTS

| | | |
|---|---|---|
| CN | 1705246 A | 12/2005 |
| CN | 101420734 A | 4/2009 |
| RU | 2107994 C1 | 3/1998 |
| WO | WO 2008/084700 A1 | 7/2008 |

OTHER PUBLICATIONS

3rd Generation Partnership Project, 3GPP TS 36.213, v8.5.0, Evolved Universal Terrestrial Radio Access physical layer procedures, release 8, Dec. 2008, total pp. 74.*

(Continued)

*Primary Examiner* — Jeffrey M Rutkowski
*Assistant Examiner* — Peter Mak
(74) *Attorney, Agent, or Firm* — Leydig, Voit & Mayer, Ltd.

(57) ABSTRACT

Embodiments of the present invention disclose a method, an apparatus and a system for allocating downlink power, which can solve the problem of downlink power allocation under a Coordinated Multi-Point transmitting (CoMP) environment and in a carrier aggregation (CA) technology. The method includes: calculating a power allocation according to measurement parameters which are of a reference signal and are reported by a terminal, and according to the number of physical resources within a measured bandwidth corresponding to each aggregate waveband, and an energy allocated to each resource block on the reference signal corresponding to the each aggregate waveband, where the number of physical resources and the energy are sent by a secondary evolved NodeB (eNB), sending the calculated power allocation to the secondary eNB, and sending to a user equipment (UE) energy information that corresponds to the reference signal corresponding to the each aggregate waveband of the secondary eNB. The present invention is applicable to downlink power allocation.

10 Claims, 4 Drawing Sheets

(56) References Cited

U.S. PATENT DOCUMENTS

2009/0285169 A1* 11/2009 Yang et al. .................. 370/329
2010/0035645 A1*  2/2010 Chang et al. ................. 455/522
2010/0216473 A1*  8/2010 Kazmi et al. ................. 455/436

OTHER PUBLICATIONS

European Patent Office, Extended European Search Report in European Application No. 09 841 689.4-2411 (Dec. 21, 2011).
Fujitsu, "3GPP TSG-RAN1 #56—Efficient HARQ Protocol for SIC based DL CoMP," R1-090705, Athens, Greece (Feb. 9-13, 2009).
International Search Report in corresponding PCT Application No. PCT/CN2009/070827 (Dec. 24, 2009).
1st Office Action in corresponding Russian Patent Application No. 2011141855/07(062610) (Aug. 3, 2012).
Written Opinion of the International Searching Authority in corresponding PCT Application No. PCT/CN2009/070827 (Dec. 24, 2009).
Alexiou et al., "Optimal MBMS Power Allocation Exploiting MIMO in LTE Networks," Research Academic Computer Technology Institute, 2009, Institute of Electrical and Electronic Engineers, Patras, Greece.
"3GPP TSG-RAN Working Group 1 Meeting #56—Power Allocation among eNBs in Closed-Loop Downlink CoMP Tranmission," Feb. 9-13, 2009, Nortel, Athens, Greece.
1st Office Action in corresponding Japanese Patent Application No. 2012-500030 (Feb. 12, 2013).
"R1-091268—Power Allocation among eNBs in Closed-Loop Downlink CoMP Transmission with CA," 3GPP TSG RAN WG1 Meeting #56bis, Mar. 23-27, 2009, 3GPP, Valbonne, France.
Notice of Allowance in corresponding Russian Patent Application No. 2011141855/07(062610) (Feb. 4, 2013).

* cited by examiner

METHOD, APPARATUS AND SYSTEM FOR ALLOCATING DOWNLINK POWER

CROSS-REFERENCE TO RELATED APPLICATIONS

This application is a national phase of International Patent Application No. PCT/CN2009/070827, filed Mar. 17, 2009, which is hereby incorporated by reference in its entirety.

FIELD OF THE INVENTION

The present invention relates to radio communication technologies, and in particular, to a technology for allocating downlink power.

BACKGROUND OF THE INVENTION

In communication systems, in order to raise the data transmission rate, a carrier aggregation (CA) technology was introduced. In original communication systems, each cell had only one waveband, while in current communication systems, multiple wavebands have been added, such as the following six wavebands: 450-470 MHz, 698-862 MHz, 790-862 MHz, 2.3-2.4 GHz, 3.4-4.2 GHz and 4.4-4.99 GHz. After the CA technology was introduced, a user equipment (UE) may use more than one waveband.

In addition to the introduced CA, in the communication systems, a Coordinated Multi-Point transmitting (CoMP) concept is also introduced. Under the current CoMP, because a non-CA case is relatively simple, a technical solution for allocating downlink power in the non-CA case has already existed. However, for a CA case, the CoMP becomes very complex, and the downlink power allocation also becomes complex. Therefore, the problem of power allocation based on the CA for multiple Evolved NodeBs (eNBs) has not been solved.

Therefore, in the current communication systems, no solution for allocating power exists in a case where the CA is introduced.

SUMMARY OF THE INVENTION

Embodiments of the present invention disclose a method and system for allocating downlink power, which can solve the problem of downlink power allocation.

The embodiments of the present invention adopt the following technical solutions:

An embodiment of the present invention provides a method for allocating downlink power. The method includes:
receiving measurement parameters which are of a reference signal and are reported by a UE and parameters which are of each aggregate waveband and are sent by a secondary eNB;
according to the received parameters, sending a transmit power of the secondary eNB on a waveband used by the UE to the secondary eNB; and
sending to the UE a first ratio of an energy of Orthogonal Frequency Division Multiplex (OFDM) technical symbols excluding the reference signal on each resource block on each downlink shared channel to an energy allocated to each resource block on the reference signal, and a second ratio of an energy of OFDM symbols including the reference signal on each resource block on each downlink shared channel to an energy of OFDM symbols excluding the reference signal on each resource block on each downlink shared channel.

An embodiment of the present invention provides another method for allocating downlink power. The method includes:
sending a parameter of each aggregate waveband to a donor eNB;
receiving a transmit power which is of a secondary eNB on a waveband used by the UE and is delivered, according to the parameter of the each aggregate waveband, by the donor eNB; and
sending downlink data to the UE according to the received transmit power.

An embodiment of the present invention provides a donor eNB, including:
a receiving unit, configured to receive measurement parameters which are of a reference signal and are reported by a UE and parameters which are of each aggregate waveband and are sent by a secondary eNB;
a first sending unit, configured to send, according to the received parameters, a transmit power of the secondary eNB on a waveband used by the UE to the secondary eNB; and
a second sending unit, configured to send to the UE a first ratio of an energy of OFDM symbols excluding the reference signal on each resource block on each downlink shared channel to an energy allocated to each resource block on the reference signal, and a second ratio of an energy of OFDM symbols including the reference signal on each resource block on each downlink shared channel to an energy of OFDM symbols excluding the reference signal on each resource block on each downlink shared channel.

An embodiment of the present invention also provides a secondary eNB, including:
a first sending unit, configured to send parameters of each aggregate waveband to a donor eNB;
a receiving unit, configured to receive a transmit power which is of the secondary eNB on a waveband used by the UE and is delivered by the donor eNB; and
a second sending unit, configured to send downlink data to the UE according to the received transmit power.

An embodiment of the present invention also provides a system for allocating downlink power, where the system includes the foregoing donor eNB and the secondary eNB. The system includes:
a donor eNB, configured to receive measurement parameters which are of a reference signal and are reported by a UE and parameters which are of each aggregate waveband and are sent by a secondary eNB; according to the received parameters, send a transmit power of the secondary eNB on a waveband used by the UE to the secondary eNB; and send to the UE a first ratio of an energy of OFDM symbols excluding the reference signal on each resource block on each downlink shared channel to an energy allocated to each resource block on the reference signal, and a second ratio of an energy of OFDM symbols including the reference signal on each resource block on each downlink shared channel to an energy of OFDM symbols excluding the reference signal on each resource block on each downlink shared channel; and
at least one secondary eNB, configured to send parameters of each aggregate waveband to the donor eNB; receive the transmit power which is of the secondary eNB on the waveband used by the UE and is delivered by the donor eNB; and according to the received transmit power, send downlink data to the UE.

In the method, apparatus and system for allocating downlink power according to the embodiments of the present invention, the UE sends measurement parameters of the reference signal to the donor eNB, and the secondary eNB sends parameters of each aggregate waveband to the donor eNB, so that the donor eNB sends, according to these parameters, the transmit power of the secondary eNB on the waveband used by the UE to the secondary eNB, and thus the secondary eNB can deliver data to the UE according to the transmit power; and the donor eNB also sends to the UE the information about the energy of OFDM symbols on each resource block on each downlink shared channel and the information about the energy allocated to each resource block on the reference signal, so that the UE can demodulate the received downlink data according to the information, and thus the downlink power allocation is completed.

BRIEF DESCRIPTION OF THE DRAWINGS

To make the technical solutions of the embodiments of the present invention or the prior art clearer, accompanying drawings used in the description of the embodiments or the prior art are briefly described in the following. Evidently, the accompanying drawings illustrate only some exemplary embodiments of the present invention and those of ordinary skill in the art may obtain other drawings based on these drawings without creative efforts.

DETAILED DESCRIPTION OF THE EMBODIMENTS

A method, an apparatus and a system for allocating downlink power according to the embodiments of the present invention are hereinafter described in detail with reference to the accompanying drawings.

It should be noted that the described embodiments are only some exemplary embodiments of the present invention, rather than all embodiments of the present invention. All other embodiments that those of ordinary skill in the art obtain without creative efforts based on the embodiments of the present invention also fall within the protection scope of the present invention.

Figure 1:
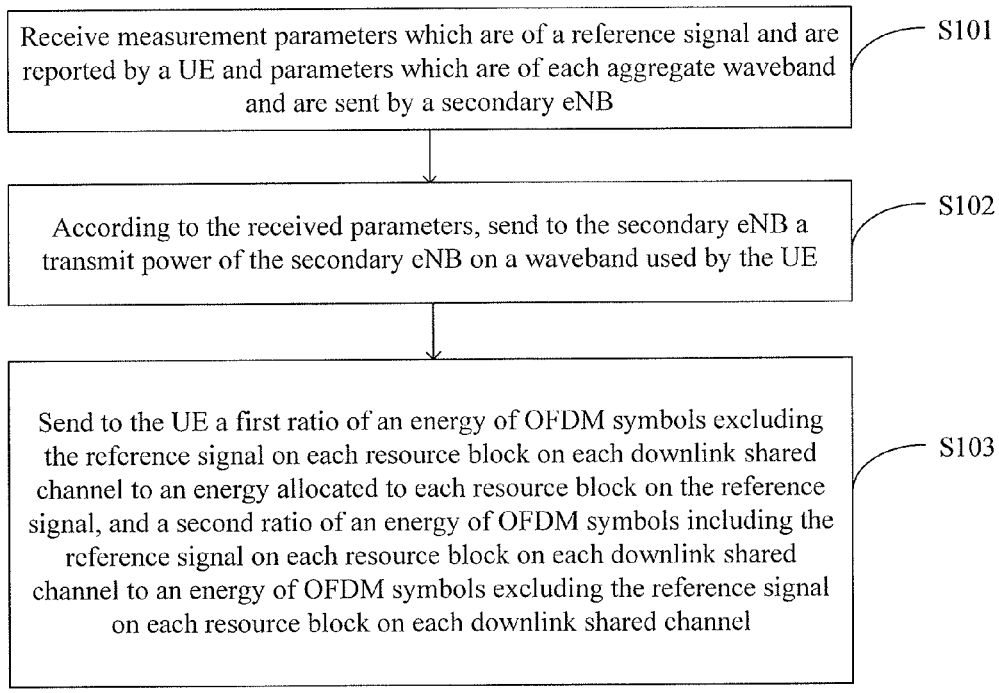
FIG. 1 is a flowchart of a method for allocating downlink power according to an embodiment of the present invention.

As shown in FIG. 1, an embodiment of the present invention provides a method for allocating downlink power. The method includes:

S101: Receive measurement parameters which are of a reference signal and are reported by a UE and parameters which are of each aggregate waveband and are sent by a secondary eNB.

S102: According to the received parameters, send a transmit power of each secondary eNB on a waveband used by the UE to the secondary eNB.

S103: Send to the UE a first ratio of an energy of OFDM symbols excluding the reference signal on each resource block on each downlink shared channel to an energy allocated to each resource block on the reference signal, and a second ratio of an energy of OFDM symbols including the reference signal on each resource block on each downlink shared channel to an energy of OFDM symbols excluding the reference signal on each resource block on each downlink shared channel.

Figure 2:
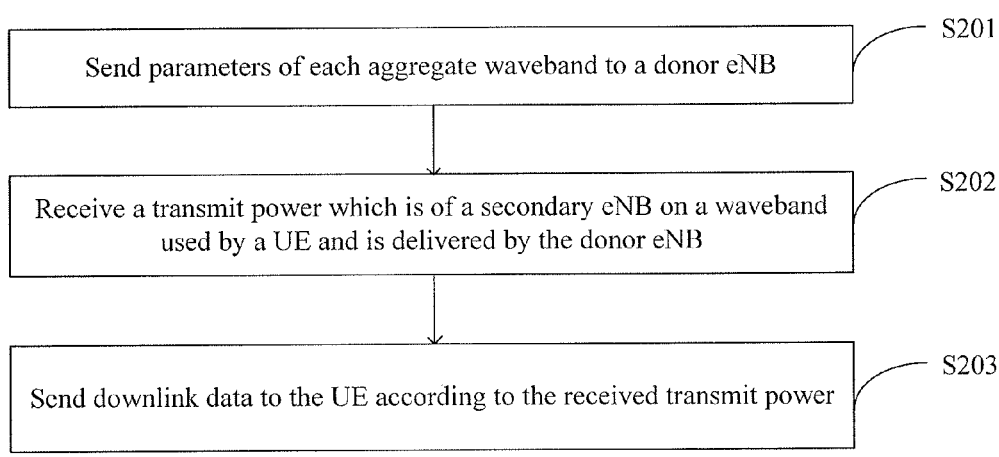
FIG. 2 is a flowchart of a method for allocating downlink power according to an embodiment of the present invention.

As shown in FIG. 2, an embodiment of the present invention also provides another method for allocating downlink power. The method includes:

S201: Send parameters of each aggregate waveband to a donor eNB.

The parameters of each aggregate waveband sent to the donor eNB include: the number of physical resources within a measured bandwidth corresponding to each aggregate waveband, and an energy allocated to each resource block on the reference signal corresponding to the aggregate wavebands.

S202: Receive a transmit power which is of the secondary eNB on a waveband used by the UE and is delivered by the donor eNB.

S203: Send downlink data to the UE according to the received transmit power.

In the method for allocating downlink power according to the embodiment of the present invention, the UE reports measurement parameters of the reference signal to the donor eNB, and each secondary eNB sends parameters of each aggregate waveband to the donor eNB, so that the donor eNB sends, according to these parameters, the transmit power of the secondary eNB on the waveband used by the UE to the secondary eNB, and thus the secondary eNB can deliver data to the UE according to the transmit power; and the donor eNB also sends to the UE the information about the energy of OFDM symbols including or excluding the reference signal on each resource block on each downlink shared channel and the information about the energy allocated to each resource block on the reference signal, so that the UE can demodulate the received downlink data according to the information, and thus the downlink power allocation is completed.

Figure 3:
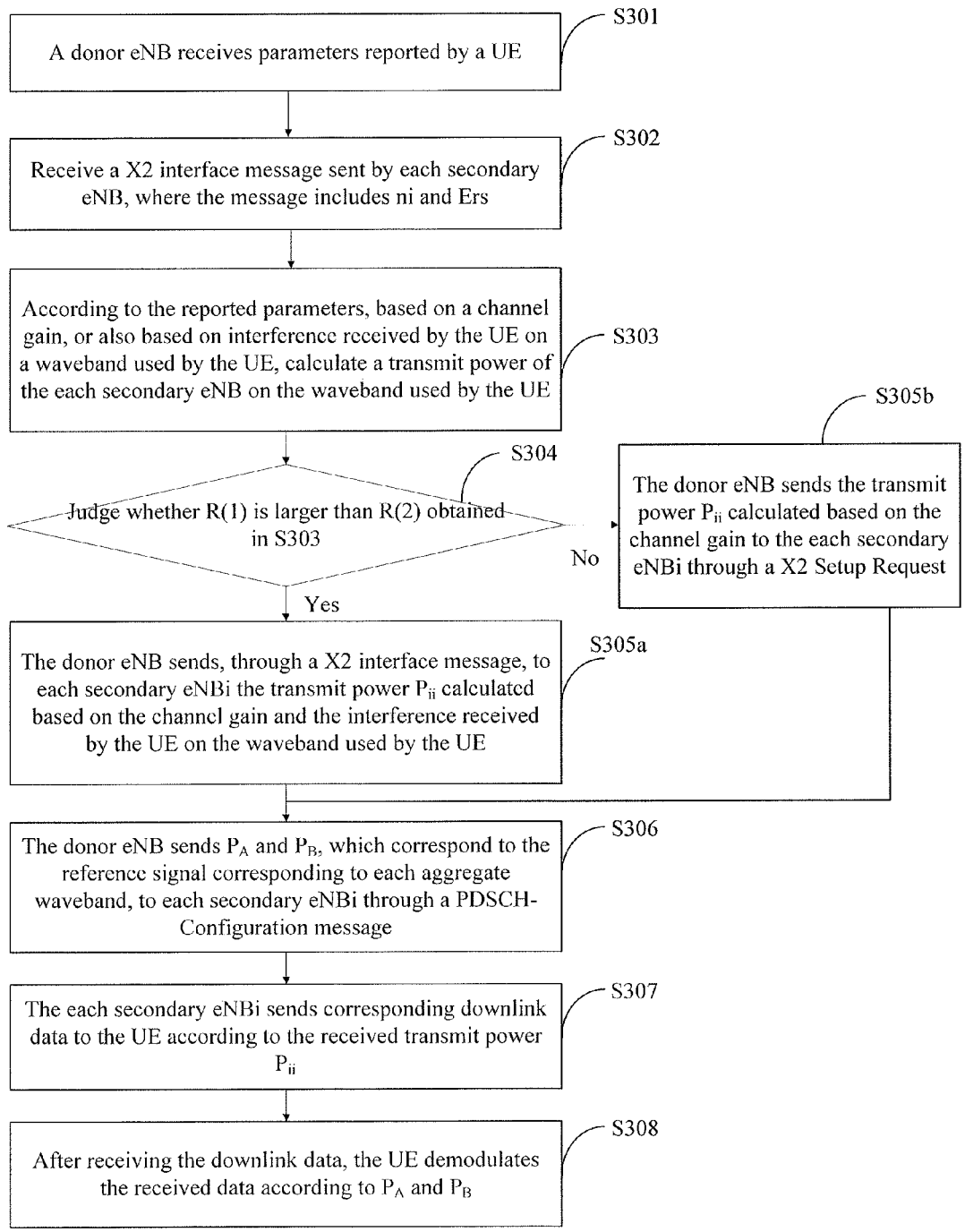
FIG. 3 is a flowchart of a method for allocating downlink power according to an embodiment of the present invention.

The implementation of the solution of the present invention is hereinafter described through a more specific embodiment. Specifically, as shown in FIG. 3, the embodiment may include the following steps:

S301: A donor eNB receives parameters reported by a UE.

Figure 4:
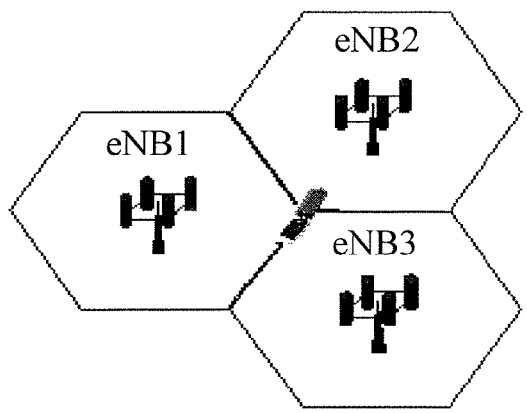
FIG. 4 is a schematic diagram of a system for allocating downlink power according to an embodiment of the present invention.

As shown in FIG. 4, this embodiment assumes that under a CoMP environment, there are three eNBs: eNB1, eNB2 and eNB3, where eNB1 is a donor eNB, while eNB2 and eNB3 are secondary eNBs. The UE uses three aggregate wavebands B1, B2 and B3, and three carriers f1, f2 and f3.

Thus, in this embodiment, the UE reports various measurement parameters to eNB1. These parameters include: a reference signal received quality $RSRQ_i$ corresponding to each aggregate waveband, a reference signal received power $RSRP_i$ corresponding to each aggregate waveband and a reference signal transmit power $P_{piloti}$ corresponding to each aggregate waveband.

S302: Receive an X2 interface message sent by each secondary eNB, where the interface message includes: the number $n_i$ of physical resources within a measured bandwidth corresponding to each aggregate waveband, and the energy $E_{rs}$ allocated to each resource block on the reference signal corresponding to each aggregate waveband.

The X2 interface message may be an X2 Setup Request or an X2 Setup Response. Each secondary eNBi obtains, according to the definition of the measured bandwidth, the number $n_i$ of physical resources within the measured bandwidth corresponding to each aggregate waveband.

S303: According to the reported parameters, based on the channel gain, or also based on the interference received by the UE on the waveband used by the UE, calculate a transmit power of each secondary eNB on the waveband used by the UE.

First, it is required to calculate the interference $N_i$ received by the UE on the waveband i used by the UE. The calculation formula is as follows:

$$N_i = \frac{n_i \cdot RSRP_i}{RSRQ_i} \quad (1)$$

i is a positive integer. In this embodiment, because there are three eNBs, three aggregate wavebands are used, so the calculation formula is specifically as follows:

$$N_1 = \frac{n_1 \cdot RSRP_1}{RSRQ_1}; N_2 = \frac{n_2 \cdot RSRP_2}{RSRQ_2}; N_3 = \frac{n_3 \cdot RSRP_3}{RSRQ_3}$$

Then, the channel gain $g_{ii}$ of the secondary eNBi to the waveband i used by the UE, $$g_{ii} = 10^{(RSRP_i - P_{piloti})} \quad (2)$$

Where, the channel gain $g_{11}$ of the secondary eNB1 to the waveband 1 used by the UE is:

$$g_{11} = 10^{(RSRP_1 - P_{pilot1})};$$

The channel gain $g_{22}$ of the secondary eNB2 to the waveband 2 used by the UE is:

$$g_{22} = 10^{(RSRP_2 - P_{pilot2})};$$

The channel gain $g_{33}$ of the secondary eNB3 to the waveband 3 used by the UE is:

$$g_{33} = 10^{(RSRP_3 - P_{pilot3})}$$

In the following analysis, assume that the Maximal Ratio Combining method is acceptable to a terminal.

I. Based on the channel gain and the interference received by the UE on the waveband used by the UE, the transmit power of each secondary eNB on the waveband used by the UE is calculated as follows:

The formula for calculating the transmit power $p_{ii}$ of eNBi on the waveband i used by the UE is:

$$\begin{cases} p_{11} + p_{22} + \ldots p_{ii} = p \\ p_{11} : p_{22} : \ldots : p_{ii} = (g_{11}/N_1) : (g_{22}/N_2) : \ldots (g_{ii}/N_i) \end{cases} \quad (3)$$

i is a positive integer.

Where, p is a total power delivered to the UE under a CoMP environment;

$p_{ii}$ is a transmit power of eNBi on the waveband i used by the UE.

This embodiment is:

$$\begin{cases} p_{11} + p_{22} + p_{33} = p \\ p_{11} : p_{22} : p_{33} = (g_{11}/N_1) : (g_{22}/N_2) : (g_{33}/N_3) \end{cases}$$

The following result may be obtained:

$$\begin{cases} p_{11} = \frac{g_{11}}{g_{11} + g_{22} + g_{33}} p \\ p_{22} = \frac{g_{22}}{g_{11} + g_{22} + g_{33}} p \\ p_{33} = \frac{g_{33}}{g_{11} + g_{22} + g_{33}} p \end{cases}$$

So the normalized channel capacity based on the channel gain and the interference received by the UE on the waveband used by the UE is:

$$R(1) = \log\left\{\left[1 + \frac{p_{11}g_{11}}{N_1}\right] \cdot \left[1 + \frac{p_{22}g_{22}}{N_2}\right] \cdot \left[1 + \frac{p_{33}g_{33}}{N_3}\right]\right\} \quad (4)$$

If there are more than three eNBs, the normalized channel capacity based on the channel gain and the interference received by the UE on the waveband used by the UE is:

$$R(1) = \log\left\{\left[1 + \frac{p_{11}g_{11}}{N_1}\right] \cdot \left[1 + \frac{p_{22}g_{22}}{N_2}\right] \ldots \left[1 + \frac{p_{ii}g_{ii}}{N_i}\right]\right\}$$

II. Based on the channel gain, the transmit power of each secondary eNB on the waveband used by the UE is calculated as follows:

The formula for calculating the transmit power $p_{ii}$ of eNBi on the waveband i used by the UE is:

$$\begin{cases} p_{11} + p_{22} + \ldots + p_{ii} = p \\ p_{11} : p_{22} : \ldots : p_{ii} = (g_{11}) : (g_{22}) : \ldots (g_{ii}) \end{cases} \quad (5)$$

i is a positive integer.

$$\begin{cases} p_{11} + p_{22} + p_{33} = p \\ p_{11} : p_{22} : p_{33} = (g_{11}) : (g_{22}) : (g_{33}) \end{cases}$$

The following result may be obtained:

$$\begin{cases} p_{11} = \frac{N_2 N_3 g_{11}}{N_2 N_3 g_{11} + N_1 N_3 g_{22} + N_1 N_2 g_{33}} p \\ p_{22} = \frac{N_1 N_3 g_{22}}{N_2 N_3 g_{11} + N_1 N_3 g_{22} + N_1 N_2 g_{33}} p \\ p_{33} = \frac{N_1 N_3 g_{33}}{N_2 N_3 g_{11} + N_1 N_3 g_{22} + N_1 N_2 g_{33}} p \end{cases}$$

So the normalized channel capacity based on the channel gain is:

$$R(2) = \log\left\{\left[1 + \frac{p_{11}g_{11}}{N_1}\right] \cdot \left[1 + \frac{p_{22}g_{22}}{N_2}\right] \cdot \left[1 + \frac{p_{33}g_{33}}{N_3}\right]\right\} \quad (6)$$

If there are more than three eNBs, the normalized channel capacity based on the channel gain is:

$$R(2) = \log\left\{\left[1 + \frac{p_{11}g_{11}}{N_1}\right] \cdot \left[1 + \frac{p_{22}g_{22}}{N_2}\right] \ldots \left[1 + \frac{p_{ii}g_{ii}}{N_i}\right]\right\}$$

S304: Compare R(1) and R(2).

If R(1)>R(2), the procedure proceeds to step S305a, and if R(1)<R(2), the procedure proceeds to step S305b.

S305a: The donor eNB sends, through an X2 interface message, to each secondary eNBi the transmit power $P_{ii}$ that is calculated based on the channel gain and the interference received by the UE on the waveband used by the UE.

That is, for example, eNB1 may send, through an eNB Configuration Update message, to eNB2 the $P_{22}$ calculated based on the channel gain and the interference $N_i$ received by the UE on the waveband used by the UE, and to eNB3 the $P_{33}$ calculated based on the channel gain and the interference $N_i$ received by the UE on the waveband used by the UE. If there are multiple secondary eNBs, a corresponding $P_{ii}$ is sent to different eNBi respectively.

S305b: The donor eNB sends, through an X2 Setup Request, the transmit power $P_{ii}$ that is calculated based on the channel gain to each secondary eNBi.

If R(1)>R(2), it indicates that a larger channel capacity can be obtained based on the channel gain and the interference $N_i$ received by the UE on the waveband used by the UE, so each secondary eNB should adopt each secondary eNB' transmit power calculated by using this algorithm; and if R(2)>R(1), it indicates that a larger channel capacity can be obtained based on the channel gain, so each secondary eNB should adopt each secondary eNB's transmit power of calculated by using this algorithm.

S306: The donor eNB sends, through a PDSCH-Configuration message, $P_A$ and $P_B$, which correspond to the reference signal corresponding to each aggregate waveband, to each secondary eNBi.

Specifically, eNB1 may send to the corresponding UE an RRC Connection Reconfiguration message carrying the $P_A$ and $P_B$ that are from eNB1, eNB2 and eNB3.

Where $$P_A = \frac{E_A}{E_{rs}},$$

and $E_A$ represents the energy of OFDM symbols excluding the reference signal on each resource block on each downlink shared channel;

$$P_B = \frac{E_B}{E_A},$$

and $E_B$ represents the energy of OFDM symbols including the reference signal on each resource block on each downlink shared channel.

After $P_A$ and $P_B$ are sent to the UE, the UE can demodulate a received downlink signal according to $P_A$ and S307: Each secondary eNBi sends corresponding downlink data to the UE according to the received transmit power $P_{ii}$.

That is, each secondary eNBi delivers data to the UE according to the received transmit power $P_{ii}$ sent by eNB1 and carried in the PDSCH-Configuration message, for example, the transmit power of eNB1 is $P_{11}$, the transmit power of eNB2 is $P_{22}$, and the transmit power of eNBi is $P_{ii}$.

S308: After receiving the downlink data, the UE demodulates the received data according to $P_A$ and $P_B$.

In the method for allocating downlink power according to this embodiment, normalized channel capacities R(2) and R(1) are obtained respectively under two cases, that is, based on the channel gain, or also based on the interference received by the UE on the waveband used by the UE; each secondary eNB' transmit power calculated by the algorithm which results in a larger normalized channel capacity is notified to each secondary eNB through an X2 interface message, so that each secondary eNB send downlink data to the UE according to the calculated transmit power, and thus the power allocation under a CoMP environment can be completed and the downlink data throughput is raised; and $P_A$ and $P_B$ are sent to the UE, so that the UE can demodulate the received data according to $P_A$ and $P_B$ and thus can obtain downlink data information.

In a method for allocating downlink power according to another embodiment of the present invention, the transmit power $p_{ii}$ of eNBi on the waveband i used by the UE may be calculated based solely on the channel gain, that is, may be calculated by the foregoing formula (3):

$$\begin{cases} p_{11} + p_{22} + \ldots p_{ii} = p \\ p_{11} : p_{22} : \ldots : p_{ii} = (g_{11}/N_1) : (g_{22}/N_2) : \ldots (g_{ii}/N_i) \end{cases} \quad (3)$$

$i$ is a positive integer.

and the calculated $P_{ii}$ is sent to the corresponding eNBi, and the eNBi sends downlink data to the UE according to the received $P_{ii}$. Accordingly, $P_{ii}$ may be sent to eNBi in the manner described in the foregoing embodiment, and meanwhile, the foregoing $P_A$ and $P_B$ also need to be sent to the UE, thus a downlink power allocation is completed. This method can be adopted because in the majority of cases, the normalized channel capacity obtained based on the channel gain is larger than the normalized channel capacity obtained based on the channel gain and the interference received by the UE on the waveband used by the UE.

Figure 5:
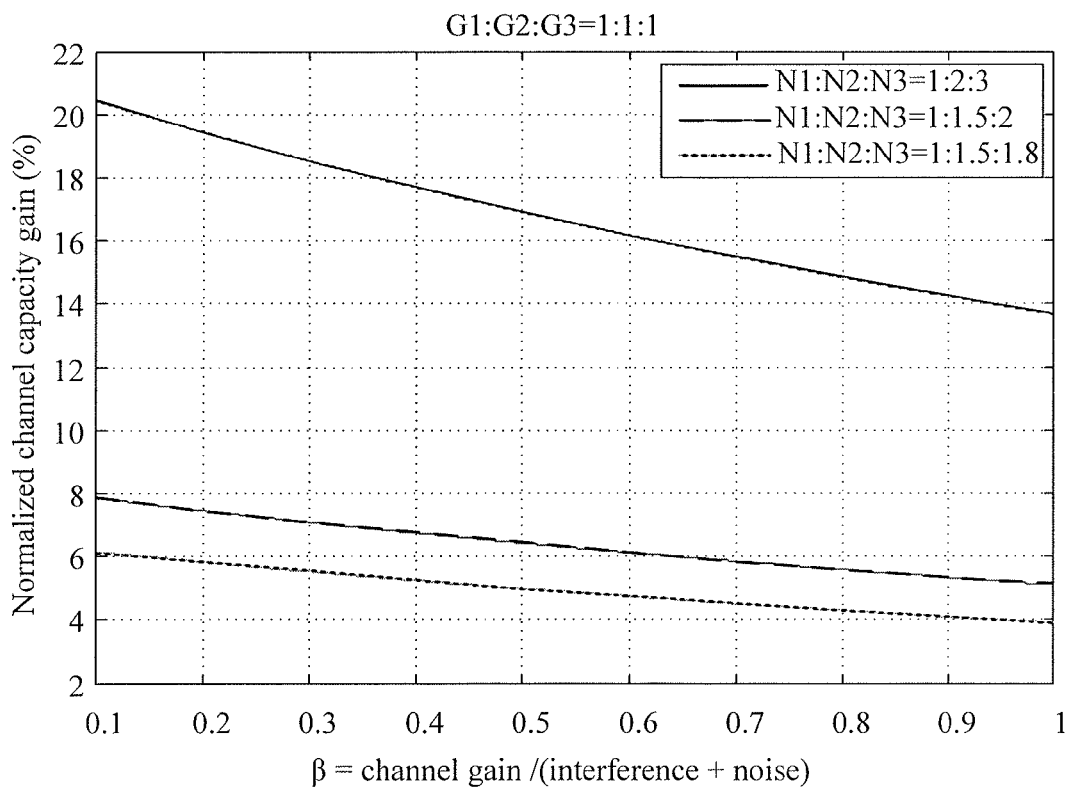
FIG. 5 is a comparative schematic diagram of normalized channel capacity based on two different algorithms.

FIG. 5 is a schematic diagram of performance improvement in terms of normalized channel capacity based on the channel gain relative to normalized channel capacity based on the channel gain and the interference received by the UE on the waveband used by the UE under a specific scenario. Where, the horizontal axis is β, that is, a ratio of the channel gain to the sum of interference and noise, and the vertical axis represents a normalized channel capacity gain based on the channel gain relative to a normalized channel capacity gain based on the channel gain and the interference received by the UE on the waveband used by the UE, that is, $$\frac{R(1) - R(2)}{R(2)} \times 100\%.$$

G1, G2 and G3 are channel gains. As can be seen, relative to the calculation result based on the channel gain, the normalized channel capacity calculated based on the channel gain and the interference received by the UE on the waveband used by the UE is obviously larger.

In the majority of cases, a result similar to that in FIG. 5 can be obtained, so the calculation based on the channel gain and the interference received by the UE on the waveband used by the UE is a preferred algorithm. Thus, a power allocation method in which the $P_{ii}$ calculated based on the channel gain and the interference received by the UE on the waveband used by the UE is directly sent to eNBi may be adopted.

Figure 6:
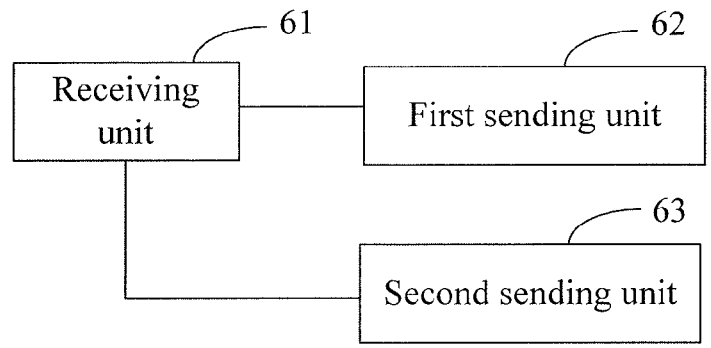
FIG. 6 is a schematic diagram of a donor eNB according to an embodiment of the present invention.

As shown in FIG. 6, an embodiment of the present invention provides a donor eNB, including:

a receiving unit 61, configured to receive measurement parameters which are of a reference signal and are reported by a UE and parameters which are of each aggregate waveband and are sent by a secondary eNB;

a first sending unit 62, configured to send, according to the received parameters, a transmit power of the secondary eNB on a waveband used by the UE to the secondary eNB; and a second sending unit 63, configured to send to the UE a first ratio of an energy of OFDM symbols excluding the reference signal on each resource block on each downlink shared channel to an energy allocated to each resource block on the reference signal, and a second ratio of an energy of OFDM symbols including the reference signal on each resource block on each downlink shared channel to an energy of OFDM symbols excluding the reference signal on each resource block on each downlink shared channel.

Figure 7:
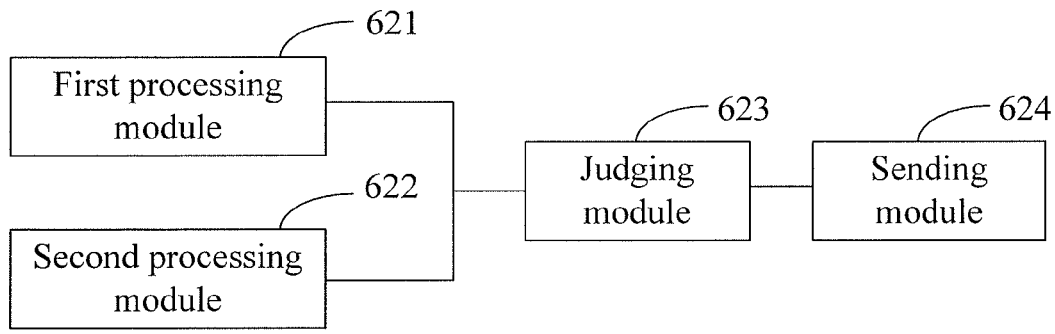
FIG. 7 is a schematic diagram of a first sending unit according to an embodiment of the present invention.

On the basis of the foregoing scheme, as shown in FIG. 7, the first sending unit 62 may further include:

a first processing module 621, configured to calculate, based on the channel gain and the interference received by the UE on the waveband used by the UE, a first transmit power of each secondary eNB on the waveband used by the UE;

a second processing module 622, configured to calculate, based on the channel gain, a second transmit power of each secondary eNB on the waveband used by the UE;

a judging module 623, configured to judge, according to the first transmit power and the second transmit power obtained respectively by the first processing module 621 and the second processing module 622, whether the normalized channel capacity calculated based on the channel gain and the interference received by the UE on the waveband used by the UE is larger than the normalized channel capacity calculated based on the channel gain or not; and when the normalized channel capacity calculated based on the channel gain and the interference received by the UE on the waveband used by the UE is larger than the normalized channel capacity calculated based on the channel gain, instruct the sending module 624 to send the first transmit power, and otherwise, instruct the sending module 624 to send the second transmit power; and a sending module 624, configured to send the first transmit power or the second transmit power to the secondary eNBs.

Figure 8:
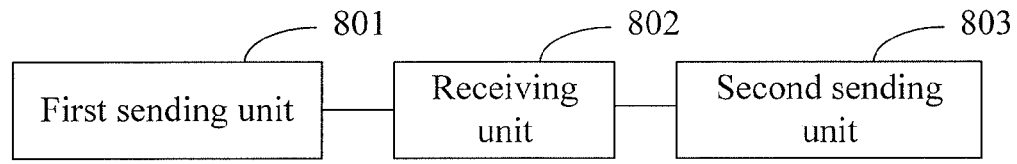
FIG. 8 is a schematic diagram of a secondary eNB according to an embodiment of the present invention.

As shown in FIG. 8, an embodiment of the present invention also provides a secondary eNB, including:

a first sending unit 801, configured to send parameters of each aggregate waveband to a donor eNB;

a receiving unit 802, configured to receive a transmit power which is of the each secondary eNB on a waveband used by the UE and is delivered by the donor eNB; and a second sending unit 803, configured to send downlink data to the UE according to the received transmit power.

The parameters which are of each aggregate waveband and sent by the first sending unit 801 include: the number of physical resources within a measured bandwidth corresponding to the each aggregate waveband and an energy allocated to each resource block on the reference signal corresponding to the aggregate wavebands.

Figure 9:
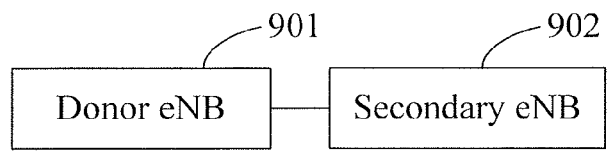
FIG. 9 is a schematic diagram of a system for allocating downlink power according to an embodiment of the present invention.

An embodiment of the present invention also provides a system for allocating downlink power, where the system includes the foregoing donor eNB and the secondary eNB. As shown in FIG. 9, a donor eNB 901 and a secondary eNB 902 cooperate to form a system for allocating downlink power, which can realize a downlink power allocation.

In the system, the donor eNB 901 is configured to receive measurement parameters which are of a reference signal and are reported by a UE and parameters which are of each aggregate waveband and are sent by the secondary eNB 902; then send, according to the parameters reported by the UE and the secondary eNB 902, a transmit power of the secondary eNB 902 on a waveband used by the UE to each secondary eNB 902; and send to the UE a first ratio of an energy of OFDM symbols excluding the reference signal on each resource block on each downlink shared channel to an energy allocated to each resource block on the reference signal, and a second ratio of an energy of OFDM symbols including the reference signal on each resource block on each downlink shared channel to an energy of OFDM symbols excluding the reference signal on each resource block on each downlink shared channel. Where, the donor eNB 901 may be implemented with reference to the scheme of FIG. 6 or FIG. 7.

The secondary eNB 902 is configured to send parameters of each aggregate waveband to the donor eNB 901; then to receive the transmit power which is of each secondary eNB on the waveband used by the UE and is delivered by the donor eNB 901; and finally send downlink data to the UE according to the received transmit power. Where, the secondary eNB 902 may be implemented with reference to the scheme of FIG. 8. There may be more than one secondary eNBs 902.

According to the embodiments of the present invention, the donor eNB, the secondary eNB and the system that is formed by the donor eNB and the secondary eNB and is used for allocating downlink power may realize downlink power allocation with reference to the embodiments of the method for allocating downlink power, which is not repeatedly described herein.

In the donor eNB, the secondary eNB and the system for allocating downlink power according to the embodiment of the present invention, the UE reports measurement parameters of the reference signal to the donor eNB, and the secondary eNB sends parameters of each aggregate waveband to the donor eNB, so that the donor eNB sends, according to these parameters, the transmit power of the secondary eNB on the waveband used by the UE to the secondary eNB, and then the secondary eNB can deliver data to the UE according to the transmit power; and the donor eNB also sends to the UE the information about the energy of OFDM symbols including or excluding the reference signal on each resource block on each downlink shared channel and the information about the energy allocated to each resource block on the reference signal, so the UE can demodulate the received downlink data according to the information, and thus the downlink power allocation is completed.

Those of ordinary skill in the art may understand that all or part of processes in the methods of the foregoing embodiments may be implemented by a computer program instructing relevant hardware. The computer program may be stored in a computer readable storage medium, and when the computer program is executed, the processes in the methods of the foregoing embodiments may be included. The storage medium may be a magnetic disk, a Compact Disk-Read Only Memory (CD-ROM), a Read Only Memory (ROM), and a Random Access Memory (RAM).

Detailed above are only exemplary embodiments of the present invention, but the protection scope of the present invention is not limited thereto. Any modification or substitution readily derived by those skilled in the art within the technical scope of the disclosure of the present invention shall be covered within the protection scope of the present invention. Therefore, the protection scope of the present invention is subject to the appended claims.

What is claimed is:

1. A method for allocating downlink power, comprising:
receiving measurement parameters which are of a reference signal and are reported by a user equipment (UE) and parameters which are of each aggregate waveband and are sent by a secondary evolved NodeB (eNB);
sending, according to the measurement parameters which are of the reference signal and the parameters which are of each aggregate waveband, a transmit power of the secondary eNB on a waveband used by the UE to the secondary eNB; and sending to the UE a first ratio of an energy of Orthogonal Frequency Division Multiplex (OFDM) symbols excluding the reference signal on each resource block on each downlink shared channel to an energy allocated to each resource block on the reference signal, and a second ratio of an energy of OFDM symbols comprising the reference signal on each resource block on each downlink shared channel to an energy of OFDM symbols excluding the reference signal on each resource block on each downlink shared channel;

wherein the sending the transmit power of the secondary eNB on the waveband used by the UE to the secondary eNB comprises:

calculating, based on a channel gain and interference received by the UE on the waveband used by the UE, a first transmit power of the secondary eNB on the waveband used by the UE, and calculating, based on the channel gain, a second transmit power of the secondary eNB on the waveband used by the UE;

if a normalized channel capacity obtained based on the channel gain and the interference received by the UE on the waveband used by the UE is larger than a normalized channel capacity obtained based on the channel gain, sending the first transmit power to the secondary eNB through an X2 interface message; and if a normalized channel capacity obtained based on the channel gain and the interference received by the UE on the waveband used by the UE is not larger than a normalized channel capacity obtained based on the channel gain, sending the second transmit power to the secondary eNB through the X2 interface message.

2. The method according to claim 1, wherein the measurement parameters which are of the reference signal and are reported by the UE comprise:

a received quality of a reference signal corresponding to each aggregate waveband, a received power of a reference signal corresponding to each aggregate waveband, and a transmit power of a reference signal corresponding to each aggregate waveband.

3. The method according to claim 1, wherein:

the parameters which are of each aggregate waveband and are sent by the secondary eNB comprise:

the number of physical resources within a measured bandwidth corresponding to each aggregate waveband and an energy allocated to each resource block on the reference signal corresponding to the aggregate wavebands.

4. The method according to claim 3, wherein the number of physical resources within the measured bandwidth corresponding to each aggregate waveband and the energy allocated to each resource block on the reference signal corresponding to the each aggregate waveband are carried in the X2 interface message.

5. The method according to claim 1, wherein the sending the first ratio and the second ratio to the UE comprises:

sending to the UE a Physical Downlink Shared Control Channel (PDSCH) Configuration message which comprises the first ratio and the second ratio.

6. A method for allocating downlink power, comprising:

sending parameters of each aggregate waveband to a donor evolved NodeB (eNB);

receiving a transmit power which is of a secondary eNB on a waveband used by a user equipment (UE) and is delivered, according to reported parameters, by the donor eNB; and sending downlink data to the UE according to the received transmit power;

wherein a first transmit power of the secondary eNB on the waveband used by the UE is calculated based on a channel gain and interference received by the UE on the waveband used by the UE, wherein a second transmit power of the secondary eNB on the waveband used by the UE is calculated based on the channel gain, wherein, if a normalized channel capacity obtained based on the channel gain and the interference received by the UE on the waveband used by the UE is larger than a normalized channel capacity obtained based on the channel gain, then the transmit power delivered by the donor eNB comprises the first transmit power and is delivered through an X2 interface message, and wherein, if a normalized channel capacity obtained based on the channel gain and the interference received by the UE on the waveband used by the UE is not larger than a normalized channel capacity obtained based on the channel gain, then the transmit power delivered by the donor eNB comprises the second transmit power and is delivered through the X2 interface message.

7. The method according to claim 6, wherein the parameters of the each aggregate waveband comprise:

the number of physical resources within a measured bandwidth corresponding to the each aggregate waveband and an energy allocated to each resource block on a reference signal corresponding to the each aggregate waveband.

8. A donor evolved NodeB (eNB), comprising:

a receiving unit, configured to receive measurement parameters which are of a reference signal and are reported by a user equipment (UE) and parameters which are of each aggregate waveband and are sent by a secondary eNB;

a first sending unit, configured to send, according to the measurement parameters which are of the reference signal and the parameters which are of each aggregate waveband received by the receiving unit, a transmit power of the secondary eNB on a waveband used by the UE to the secondary eNB; and a second sending unit, configured to send, according to the measurement parameters which are of a reference signal and the parameters which are of each aggregate waveband received by the receiving unit, to the UE a first ratio of an energy of Orthogonal Frequency Division Multiplex (OFDM) symbols excluding the reference signal on each resource block on each downlink shared channel to an energy allocated to each resource block on the reference signal, and a second ratio of an energy of OFDM symbols comprising the reference signal on each resource block on each downlink shared channel to an energy of OFDM symbols excluding the reference signal on each resource block on each downlink shared channel;

wherein the first sending unit comprises:

a first processing module, configured to calculate, based on a channel gain and interference received by the UE on the waveband used by the UE, a first transmit power of the secondary eNB on the waveband used by the UE;

a second processing module, configured to calculate, based on the channel gain, a second transmit power of the secondary eNB on the waveband used by the UE;

a judging module, configured to judge, according to the first transmit power and the second transmit power obtained by the first processing module and the second processing module whether a normalized channel capacity calculated based on the channel gain and the interference received by the UE on the waveband used by the UE is larger than a normalized channel capacity calculated based on the channel gain or not; and when the normalized channel capacity calculated based on the channel gain and the interference received by the UE on the waveband used by the UE is larger than the normalized channel capacity calculated based on the channel gain, instruct a sending module to send the first transmit power, and when the normalized channel capacity calculated based on the channel gain and the interference received by the UE on the waveband used by the UE is not larger than the normalized channel capacity calculated based on the channel gain, instruct the sending module to send the second transmit power; and the sending module, configured to send the first transmit power or the second transmit power to the secondary eNB.

9. A secondary evolved NodeB (eNB), comprising:

a first sending unit, configured to send parameters of each aggregate waveband to a donor eNB;

a receiving unit, configured to receive a transmit power which is of the secondary eNB on a waveband used by a user equipment (UE) and is delivered by the donor eNB; and a second sending unit, configured to send downlink data to the UE according to the received transmit power;

wherein a first transmit power of the secondary eNB on the waveband used by the UE is calculated based on a channel gain and interference received by the UE on the waveband used by the UE, wherein a second transmit power of the secondary eNB on the waveband used by the UE is calculated based on the channel gain, wherein, if a normalized channel capacity obtained based on the channel gain and the interference received by the UE on the waveband used by the UE is larger than a normalized channel capacity obtained based on the channel gain, then the transmit power received by the receiving unit comprises the first transmit power and is received through an X2 interface message, and wherein, if a normalized channel capacity obtained based on the channel gain and the interference received by the UE on the waveband used by the UE is not larger than a normalized channel capacity obtained based on the channel gain, then the transmit power received by the receiving unit comprises the second transmit power and is received through the X2 interface message.

10. A system for allocating downlink power, comprising:

a donor evolved NodeB (eNB), configured to:
 receive measurement parameters which are of a reference signal and are reported by a user equipment (UE) and parameters which are of each aggregate waveband and are sent by a secondary eNB;
 send, according to the measurement parameters which are of the reference signal and the parameters which are of each aggregate waveband, a transmit power of the secondary eNB on a waveband used by the UE to the secondary eNB; and
 send to the UE a first ratio of an energy of a Orthogonal Frequency Division Multiplex (OFDM) symbol excluding the reference signal on each resource block on each downlink shared channel to an energy allocated to each resource block on the reference signal, and a second ratio of an energy of an OFDM symbol comprising the reference signal on each resource block on each downlink shared channel to an energy of the OFDM symbol excluding the reference signal on each resource block on each downlink shared channel; and the secondary eNB, configured to:
 send parameters of each aggregate waveband to the donor eNB;
 receive the transmit power which is of the secondary eNB on the waveband used by the UE and is delivered by the donor eNB; and
 according to the received transmit power, send downlink data to the UE wherein a first transmit power of the secondary eNB on the waveband used by the UE is calculated based on a channel gain and interference received by the UE on the waveband used by the UE, wherein a second transmit power of the secondary eNB on the waveband used by the UE is calculated based on the channel gain, wherein, if a normalized channel capacity obtained based on the channel gain and the interference received by the UE on the waveband used by the UE is larger than a normalized channel capacity obtained based on the channel gain, then the transmit power received by the secondary eNB comprises the first transmit power and is received through an X2 interface message, and wherein, if a normalized channel capacity obtained based on the channel gain and the interference received by the UE on the waveband used by the UE is not larger than a normalized channel capacity obtained based on the channel gain, then the transmit power received by the secondary eNB comprises the second transmit power and is received through the X2 interface message.

* * * * *